April 12, 1938.    L. V. McLAUGHLIN    2,113,993

PLUMP BOB

Filed Sept. 20, 1937

Inventor
Leo V. McLaughlin
By Clarence A. O'Brien
Hyman Berman
Attorneys

Patented Apr. 12, 1938

2,113,993

UNITED STATES PATENT OFFICE 2,113,993

PLUMB BOB

Leo Vincent McLaughlin, Vineland, N. J.

Application September 20, 1937, Serial No. 164,821

1 Claim. (Cl. 33—210)

This invention relates to a plumb bob, the general object of the invention being to so form the bob that it can be used in windy weather as the bob is provided with spirit glasses for indicating when the line attached to the bob is perfectly straight and vertical.

This invention also consists in certain other features of construction and in the combination and arrangement of the several parts to be hereinafter described, illustrated in the accompanying drawing and specifically pointed out in the appended claim.

In describing the invention in detail, reference will be had to the accompanying drawing wherein like characters denote like or corresponding parts throughout the several views, and in which:—

Figures 1, 2, 3:
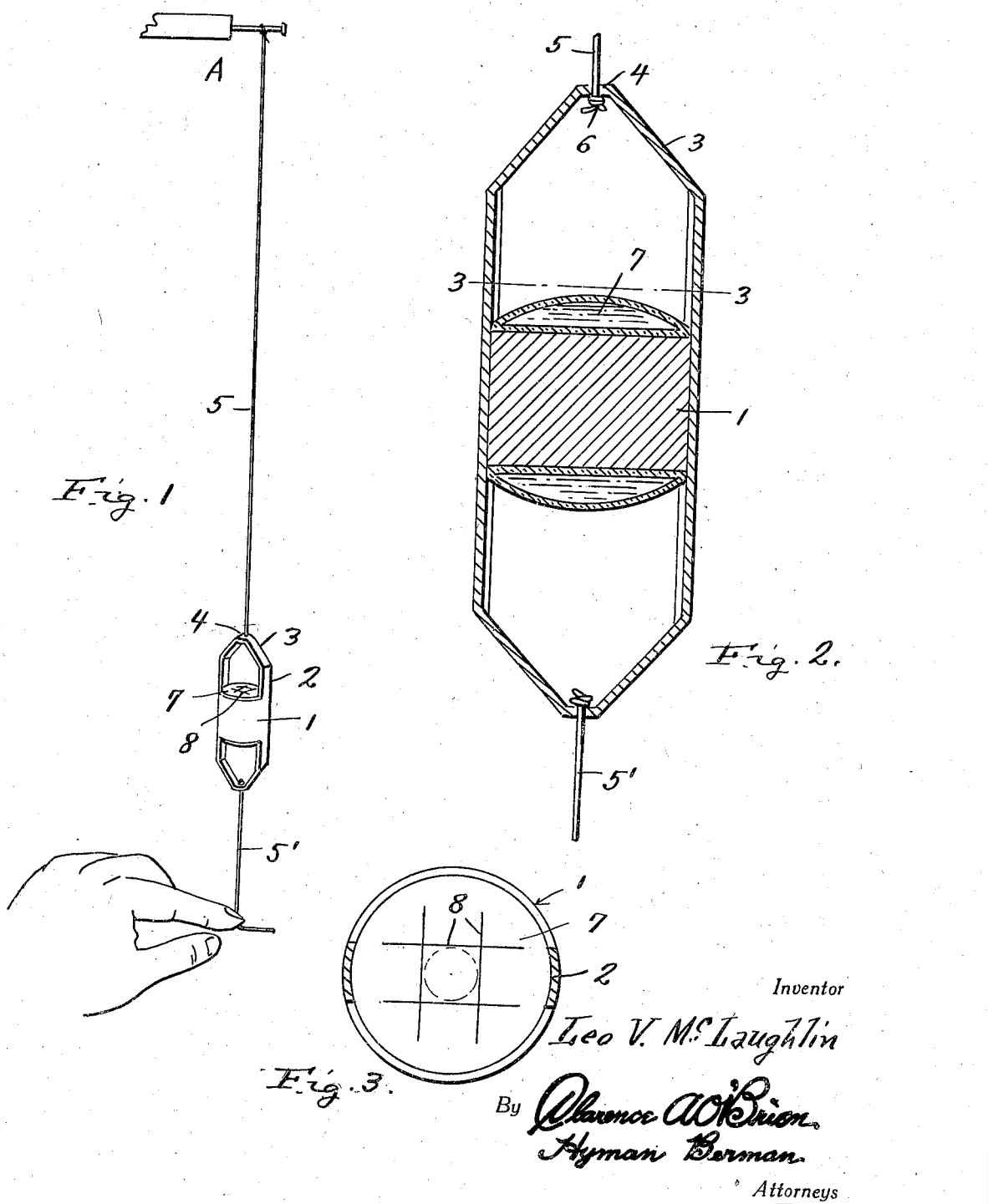
Figure 1 is a view showing how the device is used.
Figure 2 is a longitudinal sectional view through the device.
Figure 3 is a section on the line 3—3 of Figure 2.

As shown in this drawing the bob is composed of a cylindrical part 1 and the outwardly extending arms 2 at each end thereof, the arms being connected together by the substantially V-shaped part 3 which has a flat end 4 having a hole therein for receiving an end of a line 5 which is secured in the hole in any suitable manner, such as forming a knot 6 at the end of the line. As will be seen the line is composed of two parts 5 and 5', one extending from one end of the device and the other from the opposite end thereof as shown in Figure 1. A spirit glass 7 is connected to each end of the cylindrical part 1, each level having a flat inner face which is suitably secured to the end of the part 1 and a convex outer face so that the bubble formed by the liquid in the glass can be readily observed by a person glancing at that glass which is uppermost. The convex face of the glass is formed with the cross lines 8 for facilitating reading of the glass.

As will be seen this device can be used with either end uppermost and by attaching one end of the string to a suppoprt A, as shown in Figure 1, and then adjusting the other end of the string, or the end of the part 5', to a point where the bubble centers itself in the upper glass one will know that the line is plumb and perfectly vertical and this can be done even in a strong wind. With this type of bob one can find a point on an upper member which is directly opposite a point on a lower member, by fastening a part of the line to the lower member and then using the bob to find the upper point on the upper member.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:—

A plumb bob of the class described comprising a member having a centrally arranged cylindrical part, spirit glasses connected with the upper and lower faces of said part, each glass having a convexed outer face, a pair of oppositely arranged arms extending outwardly from each end of the cylindrical part and terminating in converging portions and upper and lower flexible members connected with the apexes of said portions of the pairs of arms.

LEO VINCENT McLAUGHLIN.